(12) United States Patent
Oi (10) Patent No.: US 7,660,411 B2
(45) Date of Patent: Feb. 9, 2010

(54) PORTABLE TELEPHONE

(75) Inventor: Kenichi Oi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 25 days.

(21) Appl. No.: 10/594,237

(22) PCT Filed: May 31, 2004

(86) PCT No.: PCT/JP2004/007870

§ 371 (c)(1),
(2), (4) Date: Sep. 25, 2006

(87) PCT Pub. No.: WO2005/117399

PCT Pub. Date: Dec. 8, 2005

(65) Prior Publication Data

US 2007/0211889 A1  Sep. 13, 2007

(51) Int. Cl.
*H04M 1/00* (2006.01)
*H04M 9/00* (2006.01)

(52) U.S. Cl. .............................. 379/433.12; 379/433.01
(58) Field of Classification Search ............ 379/433.12; 455/575.4, 575.1
See application file for complete search history.

(56) References Cited

U.S. PATENT DOCUMENTS

| | | | |
|---|---|---|---|
| 5,335,274 A | 8/1994 | Masuda et al. | |
| 6,822,871 B2 * | 11/2004 | Lee et al. | 361/727 |
| 7,084,345 B1 * | 8/2006 | Chen et al. | 174/545 |
| 7,162,283 B2 * | 1/2007 | Bae et al. | 455/575.4 |
| 2004/0198246 A1 | 10/2004 | Tsai | |
| 2005/0079898 A1 * | 4/2005 | Park | 455/575.1 |
| 2007/0004476 A1 * | 1/2007 | Lee | 455/575.4 |

FOREIGN PATENT DOCUMENTS

| | | |
|---|---|---|
| CN | 1441611 A | 9/2003 |
| JP | 04-273744 | 9/1992 |
| JP | 2003-110675 | 4/2003 |
| JP | 2003-234809 | 8/2003 |
| KR | 1020040008240 | 1/2004 |
| TW | 559 437 | 10/2003 |
| WO | WO 03/092251 | 11/2003 |

* cited by examiner

*Primary Examiner*—Curtis Kuntz
*Assistant Examiner*—Phylesha Dabney
(74) *Attorney, Agent, or Firm*—Oblon, Spivak, McClelland, Maier & Neustadt, L.L.P.

(57) ABSTRACT

A portable telephone in which two bodies thereof are placed in superposed relation, and one body slides relative to the other body to change how far they superpose, thus expanding and contracting the overall length of the telephone in the sliding direction. The one body can pull out relative to the other body with an area left where a part of the one body is superposed on the other body in the extended state. Engaging members, i.e. engaging pawls and sliders, that serve as a rotation preventing mechanism for preventing the two bodies from relative rotating are intensively provided in the superposed area within the extended state.

2 Claims, 8 Drawing Sheets

FIG.14 and close the telephone by expanding and contracting the full
PORTABLE TELEPHONE

TECHNICAL FIELD

The present invention relates to a portable telephone in which two bodies thereof are placed in superposed relation, and a part of one body slides relative to the other body to open length of the telephone in the sliding direction.

BACKGROUND ART

Known conventional portable telephones in which two bodies thereof are placed in superposed relation, and one body slides relative to the other body to open and close the telephone by expanding and contracting the full length of the telephone in the sliding direction, include, as shown in JP-A-2003-110675, for example, a portable telephone, in which a guide slot providing a rotation-preventing ability is formed mostly along the full length of each side of one body, and a slide piece provided on the other body is engaged in the guide slot and slides along it for opening and closing the telephone.

The conventional portable telephone is thus arranged as mentioned above. Through this arrangement, relative sliding of the two bodies for putting the telephone in the opened state from the state where the two bodies are superposed completely results in exposure of the guide slot to outside, thus imposing restrictions in deliberately designing a decoration for the telephone. Further, the exposure of the guide slot provided as a sliding portion causes dirt adhesion to that portion, which may impair smooth sliding. Furthermore, the guide slot provided mostly along the full length of the both edges of the body narrows an available component-mounting space thereof.

The present invention has been made to solve the above-mentioned problems. An object of the present invention is to provide a portable telephone in which one body can pull out relative to the other body with an area left where a part of one body is superposed on the other body in the extended state, and a rotation preventing mechanism for preventing the two bodies from relatively rotating is intensively provided within the superposed area in the extended state, which prohibits the rotation preventing mechanism from being exposed to outside during sliding and narrows less available component-mounting space.

DISCLOSURE OF THE INVENTION

A portable telephone according to the present invention is a portable one in which two bodies thereof are placed in superposed relation, and one body slides relative to the other body to change how far they superpose, thus expanding and contracting the full length of the telephone in the sliding direction, wherein one body can pull out relative to the other body with an area left where a part of one body is superposed on the other body in the extended state, and a rotation preventing mechanism for preventing the two bodies from relatively rotating is intensively provided within the superposed area in the extended state.

According to the present invention, the invention exerts an effect that the rotation preventing mechanism is prohibited from being outwardly exposed during sliding and down-sized mechanism narrows less available component-mounting space.

BEST MODE FOR CARRYING OUT THE INVENTION

Hereinafter, the best mode for carrying out the present invention will now be described in detail with reference to the accompanying drawings.

First Embodiment

The external structure and an outline of an operation of the portable telephone according to the present invention will be described first.

Figure 1:
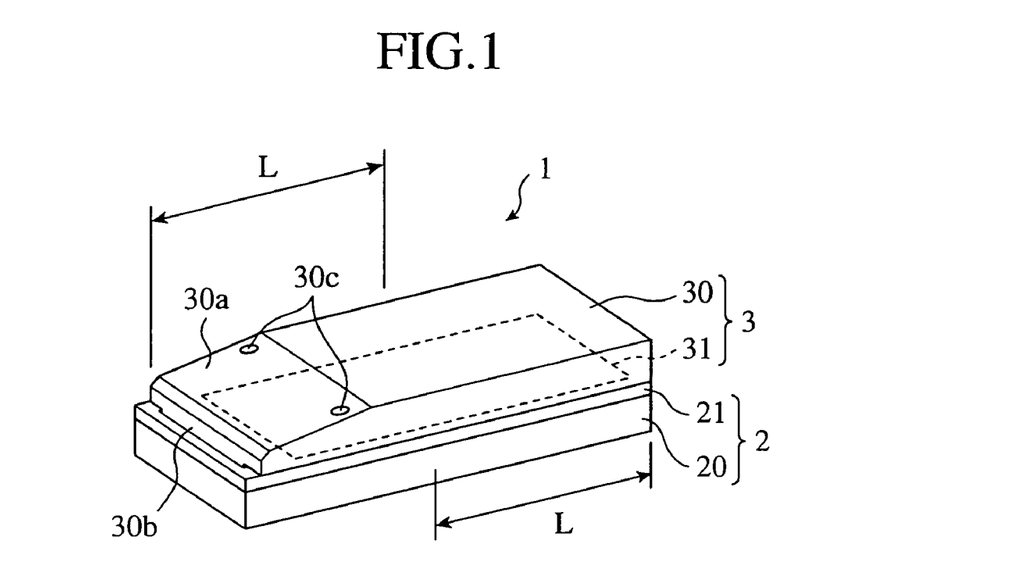
FIG. 1 is an oblique view showing an external appearance of a portable telephone according to First and Second Embodiments of the present invention in the closed sate.
Figure 2:
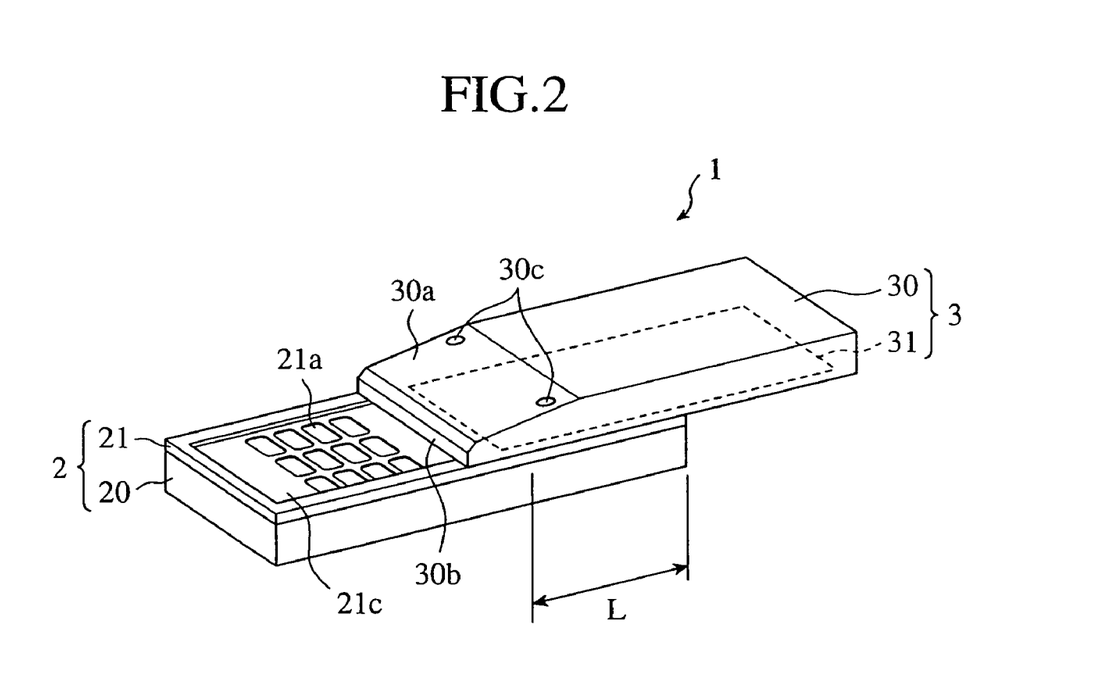
FIG. 2 is an oblique view showing an external appearance of the portable telephone according to the First and Second Embodiments of the present invention in the opened state.

FIG. 1 and FIG. 2 show external appearance of the portable telephone according to the first embodiment of the present invention, wherein FIG. 1 shows the closed state thereof, while FIG. 2 does the opened state thereof, respectively.

In FIG. 1 and FIG. 2, the portable telephone 1 roughly composes of two bodies, i.e. one body 2 and the other body 3 superposed thereon. Additionally, as a member concealed from outside and cannot tell whether they belong to the body 2 or to the body 3, the telephone includes a wiring member (a flexible substrate 6, see FIGS. 2 and 11-13) for connecting these bodies 2 and 3. The wiring member will be touched upon later. For the convenience of description, the body 2 positioned thereunder is referred to as the first body 2, and the body positioned thereon is done as the second body 3.

The first body 2 is an assembly composed of a lot of combined members, and includes, as the main members viewed from outside, a flat- and rectangular-shaped first base body 20, and a first plate 21 superposed on and secured to the first base body 20. They present external appearance of a flat and rectangular shape as a whole.

The body 3 is also an assembly composed of many combined members; however, among which only a second base body 30 can be viewed from outside. The second base body 30 is of a flat and rectangular shape enough to be substantially superposed on the first body 2, of which portion positioned on its one-end in the longitudinal direction forms a sloping face 30a. The second base body 30 is provided with a second plate 31 secured to its interior thereof 30 by means of screws 84 serving as a fastening means to be mentioned later through screw holes 30c formed on the sloping face 30a (see FIG. 2, FIG. 3, and FIG. 4).

The first body 2 and the second body 3 are arranged to be able to relatively slide in the longitudinal direction to displace from each other. Therefore, one has difficulty in distinguishing which is the fixed side or the moving side. Herein, an explanation is made for convenience' sake by assuming that the second body 3 moves with respect to the first body 2.

The portable telephone 1 can take, as shown in FIG. 1, the closed position in which the second body 3 is superposed on the first body 2 with truing up their edges. In contrast, the portable telephone can be displaced to the opened position in which the second body 3 slid in the longitudinal direction and is pulled out relative to the first body 2 from the closed position, as shown in FIG. 2.

That is, the portable telephone is such a type in which two bodies thereof are placed in superposed relation, one body slides relative to the other body to change how far they superpose, thus expanding and contracting the overall length of the telephone in the sliding direction.

However, note that pulling-out is not permitted without limitation. It is arranged such that a stopper means enables one body (the first body 2) to pull out relative to the other body (the second body 3) with an area left where a part of one body is superposed on the other body within the range of a section L shown in FIG. 2.

When the first body is thus pulled out with the area left where a part of one body is superposed on the other body within the range of the section L, operation keys 21a, which have been concealed until that time, emerge therefrom to put it in the state where operation keys 21a are available. Of course, the first body 2 pulled out to the opened state shown in FIG. 2 can be restored to the closed state shown in FIG. 1.

When supposing three-dimensional orthogonal coordinate axe where the sliding direction is defined as Y axis, the superposing direction as Z axis, and the direction orthogonal to the Y axis within the plane parallel to the superposed face as X axis, the superposed area is an area where a part of the first body 2 is superposed on the second body 3 within the section L in the Y-axial direction.

Thus, a feature of the portable telephone according to the present invention consists in that a rotation preventing mechanism for preventing the two bodies from relatively rotating is intensively provided within the superposed area in the extended state. By virtue of the rotation preventing mechanism to be discussed later an effect is exerted that the rotation preventing mechanism is prohibited from being exposed to outside during skidding, and that the down-sized mechanism narrows less component-mounting space.

In this embodiment, the section L, which is the distance of the superposed area in the Y-axial direction, is set to be approximately half the overall length of each body in the Y-axial direction. The section L is the section occupied leftward from the right end in the Y-axial direction, in terms of the first body 2 and is also the section occupied rightward from the left end in the Y-axial direction in terms of the second body 3.

The internal structure of the portable telephone according to the present invention will be described referring to FIGS. 2-9.

Figure 3:
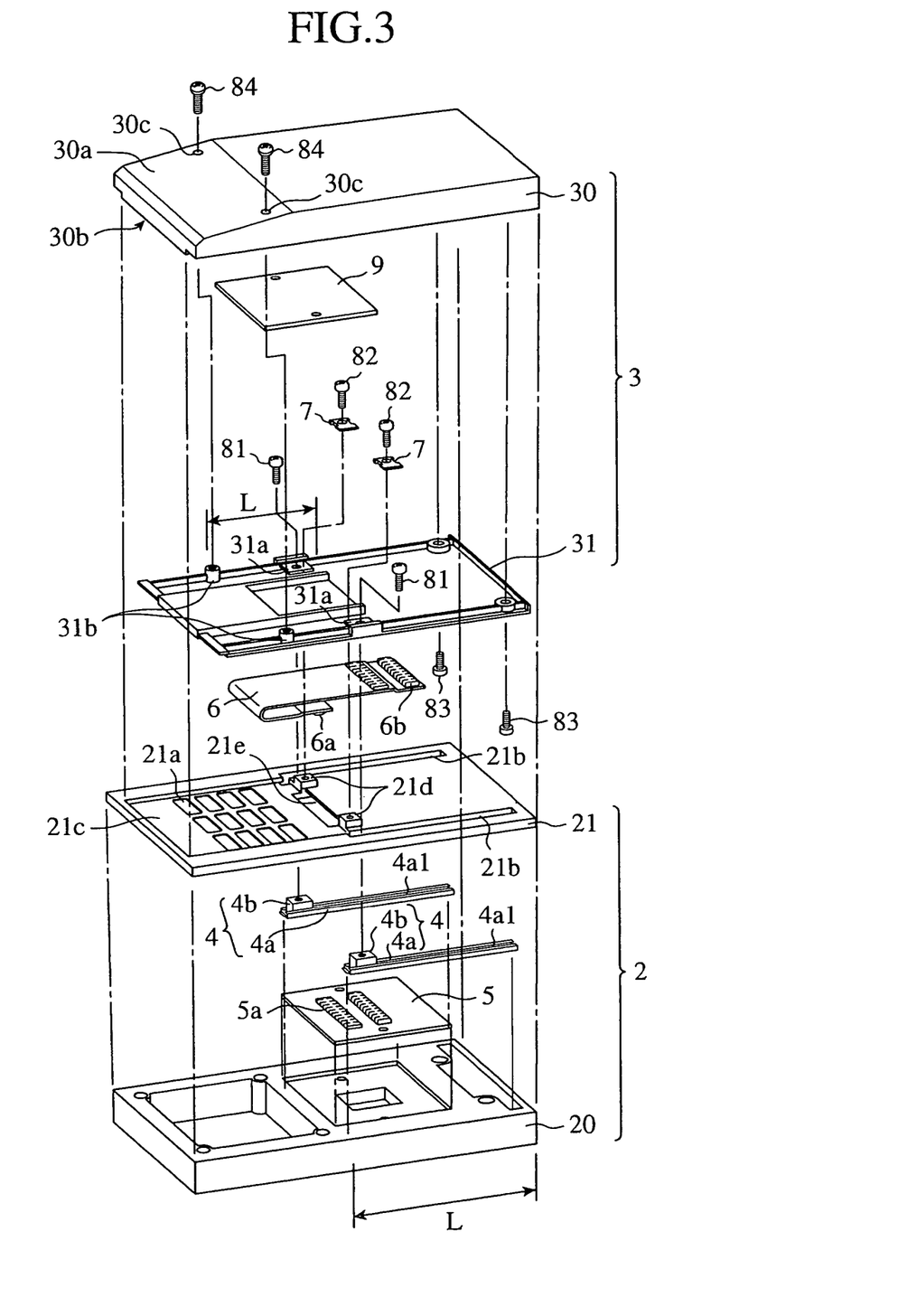
FIG. 3 is an exploded oblique view showing the portable telephone according to the First and Second Embodiments of the present invention in the closed state.
Figure 4:
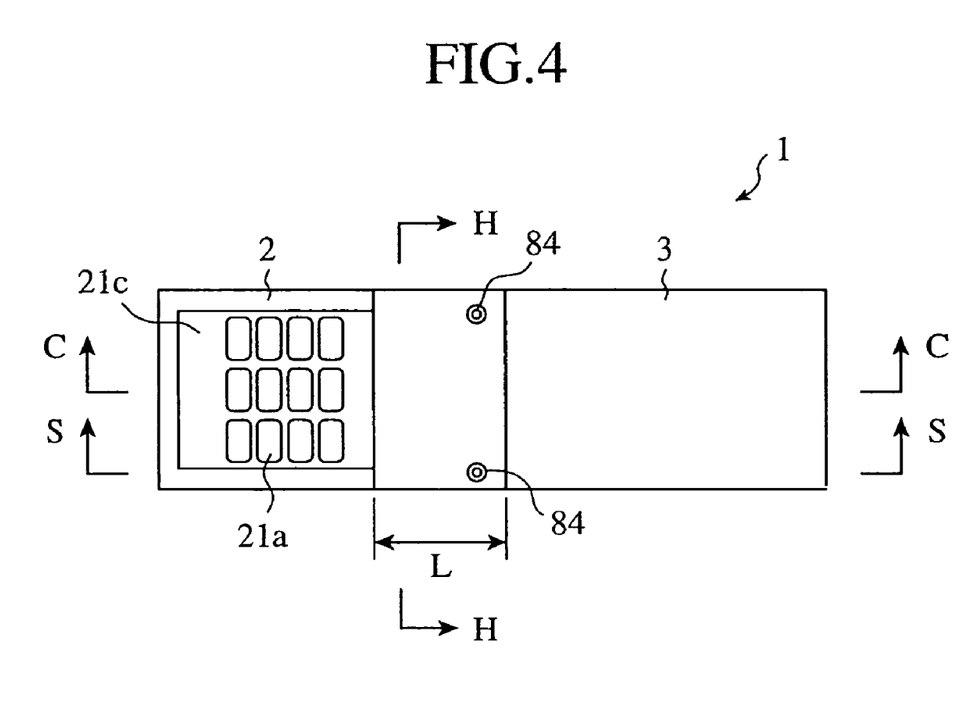
FIG. 4 is a plan view showing the portable telephone according to the First and Second Embodiments of the present invention in the opened state.
Figure 5:
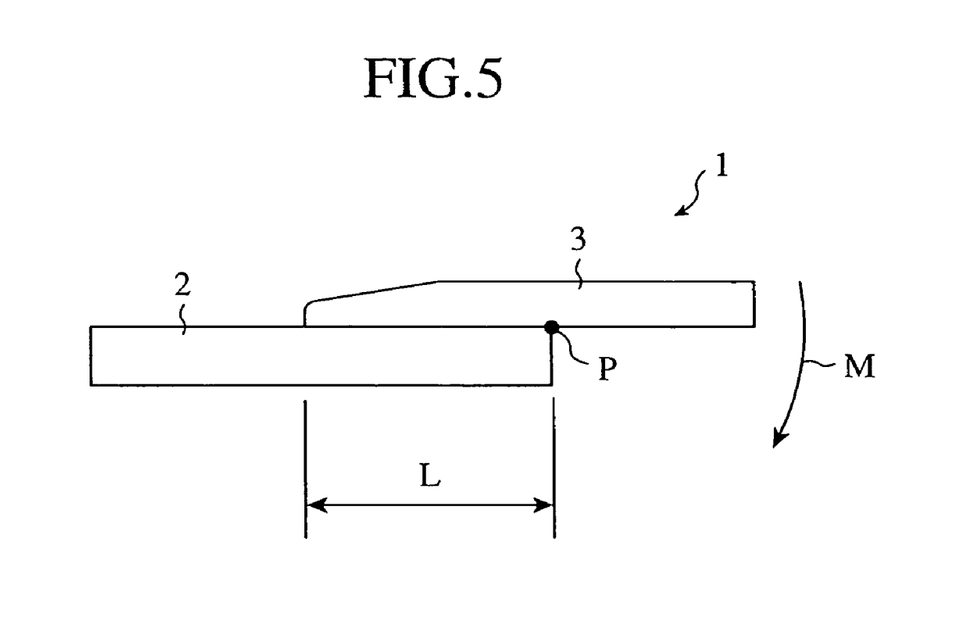
FIG. 5 is a front view showing the portable telephone according to the First Embodiment of the present invention in the opened state.
Figure 6:
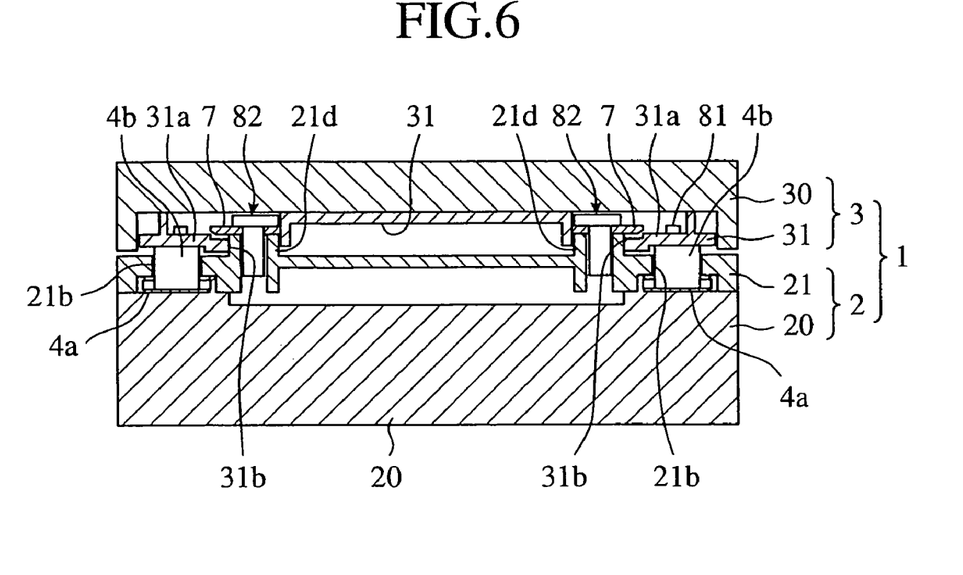
FIG. 6 is a sectional view showing the portable telephone according to the First Embodiment of the present invention.
Figure 7:
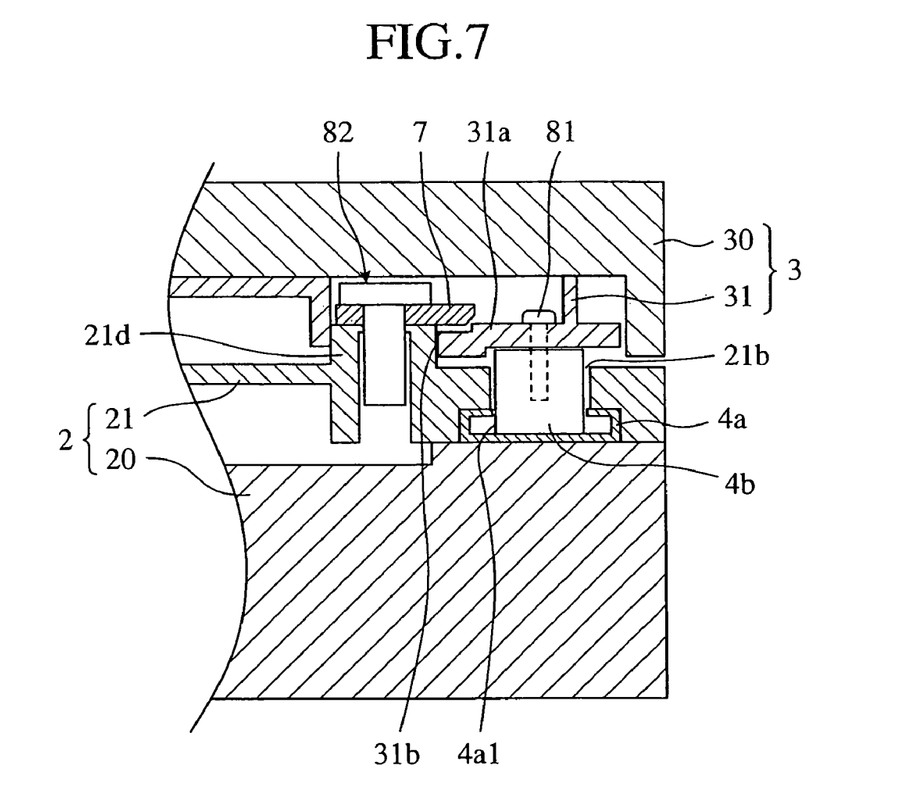
FIG. 7 is a partially enlarged sectional view showing the portable telephone shown in FIG. 6.
Figure 8:
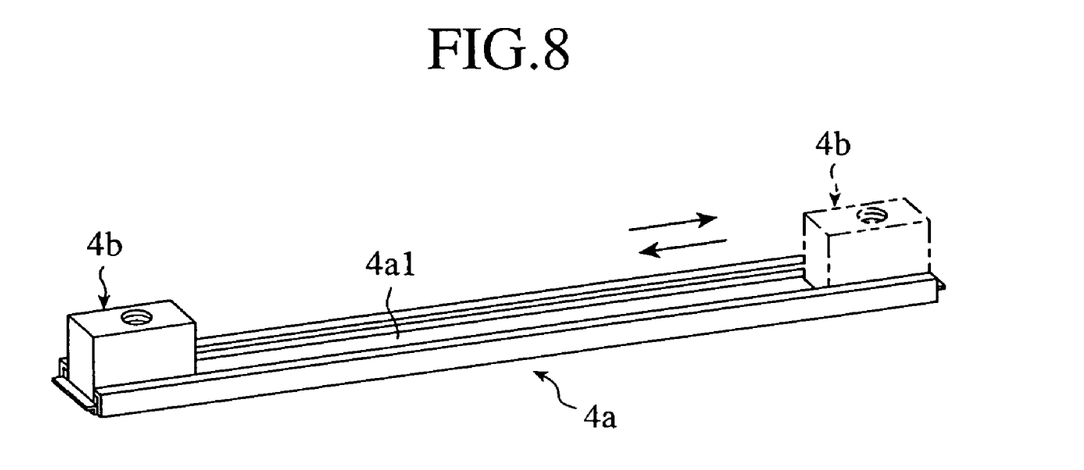
FIG. 8 is an oblique view showing a slide rail and a slider according to the First Embodiment of the present invention.
Figure 9:
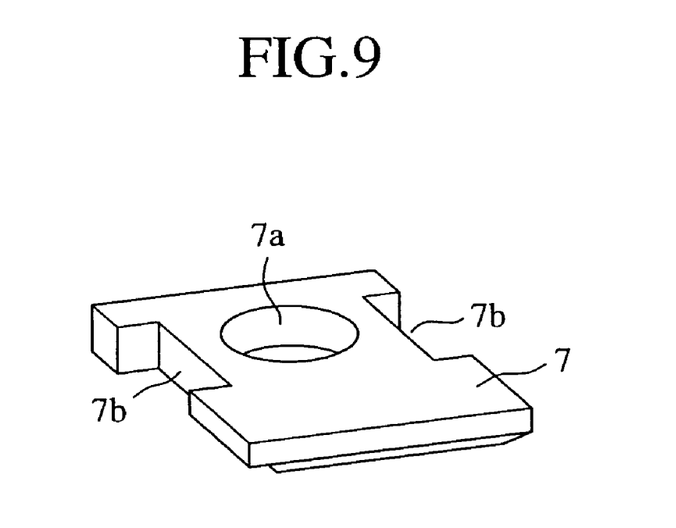
FIG. 9 is an oblique view showing an engaging pawl according to the First Embodiment of the present invention.
Figure 10:
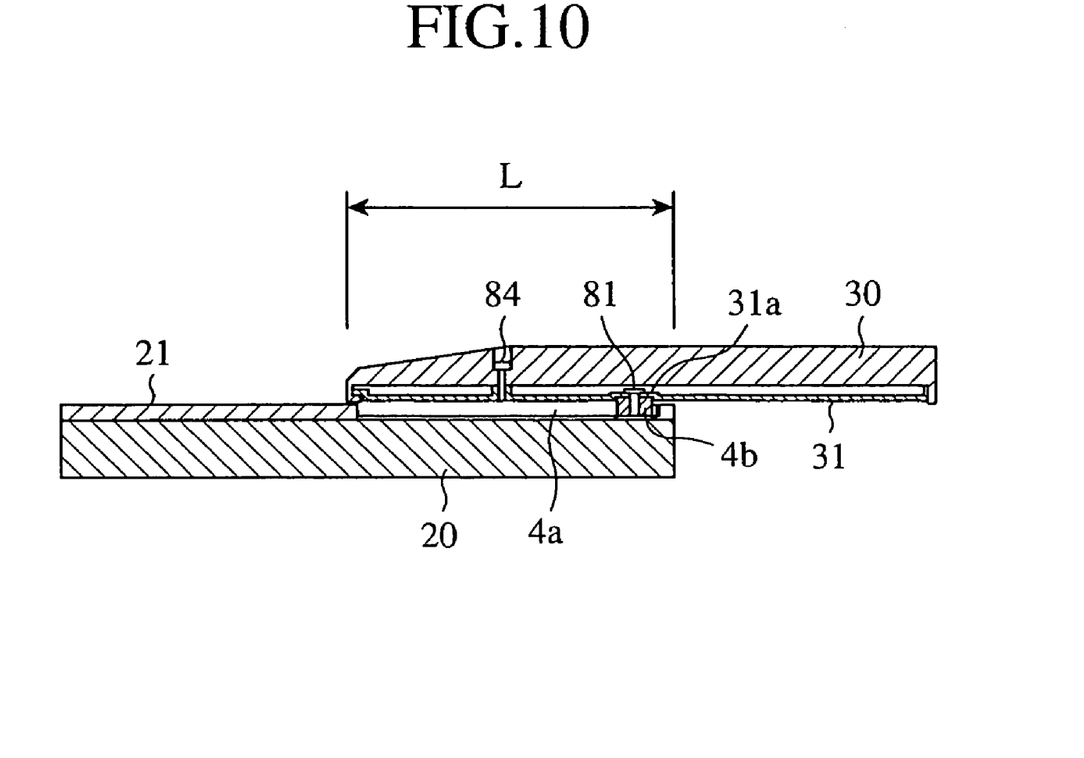
FIG. 10 is a sectional view, taken along the line S-S of FIG. 4, showing the portable telephone according to the First Embodiment of the present invention in the opened state.
Figure 11:
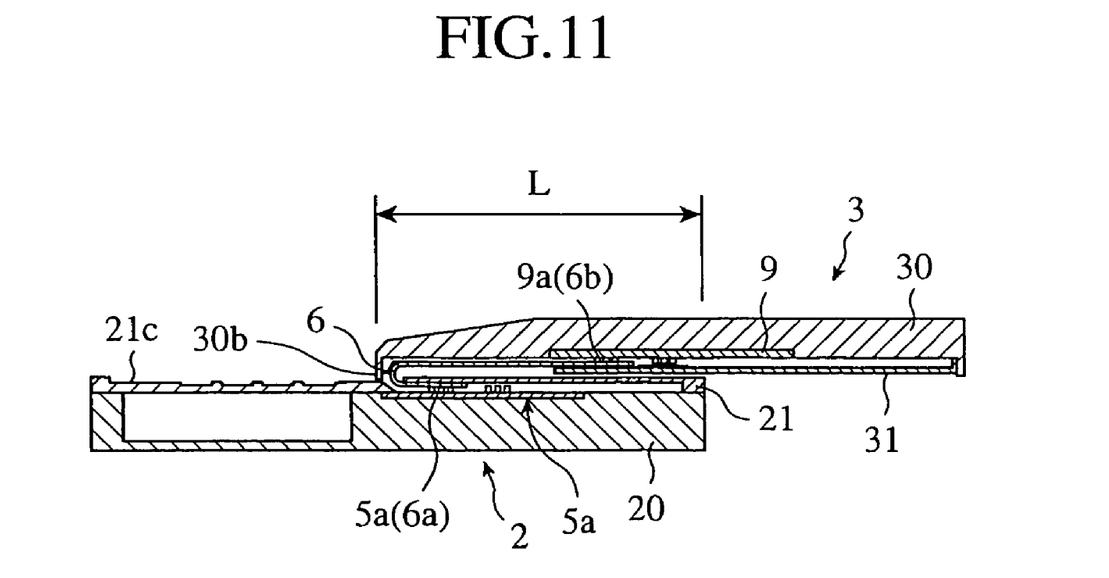
FIG. 11 is a sectional view, taken along the line C-C of FIG. 4, showing the portable telephone according to the First and Second Embodiments of the present invention in the opened state.

FIG. 3 shows the disassembled portable telephone 1 in the closed state in FIG. 1. Further, FIG. 4 is a plan view showing the portable telephone 1 in the opened state in FIG. 2; FIG. 5 is a front view showing the portable telephone 1 shown in FIG. 4, viewed from the X-axial direction; FIG. 6 is a sectional view showing the portable telephone 1 taken along the line H-H in FIG. 4; FIG. 7 is a partially enlarged sectional view showing a portion of FIG. 6 on an enlarged scale; FIG. 8 and FIG. 9 are oblique views showing respective members; FIG. 10 is a sectional view showing the portable telephone 1 taken along the line S-S in FIG. 4; and FIG. 11 is a sectional view showing the portable telephone 1 taken along the line C-C in FIG. 4.

First of all, the first body 2 will be described about the first base body 20 and first plate 21, which are the primary structural members thereof, and members placed therebetween.

The right end of the first base body 20 and that of the first plate 21 in the Y-axial direction are conformed to each other, and the right end of the first base body 30 forms the right end of the first body 2. A substrate 5 is secured to a concavity formed in a rightwardly portion on the top of the first base body 20 in the Y-axial direction. A connector 5a is provided on the top of the substrate 5. Further, two slide rails 4a are secured to the both sides of the substrate 5 mounted on the top of the first base body 20 in the X axial direction, parallel to the base body in the Y-axial direction.

The slide rail 4a, as shown in FIG. 6 and FIG. 7 and in FIG. 8 its cross-sectional shape, is a long member having a groove 4a1 of which upper part opened and is long in the Y-axial direction. A slider 4b made of a rectangular block and serving as a sliding piece is slidably fitted in the groove 4a1.

Although the slider 4b is slidable along the interior of the groove 4a1 therein, the slider is arranged to stop sliding by the ends of the slit 21b provided in the first plate 21 to be described later.

The position where the slide rail 4a is disposed is on the top of the first base body 20 and placed within the range of the section L. As discussed hereinabove, while the slider 4b is slidable along the interior of the groove 4a1 formed in the slide rail 4a, the slider is located at the left end of the groove 4a1 in the Y-axial direction in FIG. 3.

On the top of the first base body 20 the first plate 21 is secured, the first plate having the thickness thinner than that of the first base body 20 in the Z-axial direction, and being of a size enough to be completely superposed on the first base body 20. Further, a clearance is formed in the central portion in the X-axial direction between the back of the first plate 21 and the top of the first base body 20, as shown in FIG. 6 and FIG. 7. In FIG. 6 and FIG. 7, connectors 5a positioned in the clearance and members accompanied with them are not shown for simplification.

On the underside of the first plate 21 grooves are respectively formed for receiving therein the two slide rails 4a, and further, the portion of each of these grooves, corresponding to the just above position of the groove 4a1 of the slide rail 4a is communicated to the upper side by a slit 21b having the substantially same groove width as that of the groove 4a1.

As shown in FIG. 6 and FIG. 7, the slider 4b slidably fits in, passes through each of these slits 21b, and projects upwardly from the top of the first plate 21. Accordingly, both ends of the slit 21b in the Y-axial direction, each serving as a stopper of the slider 4b.

Figure 12:
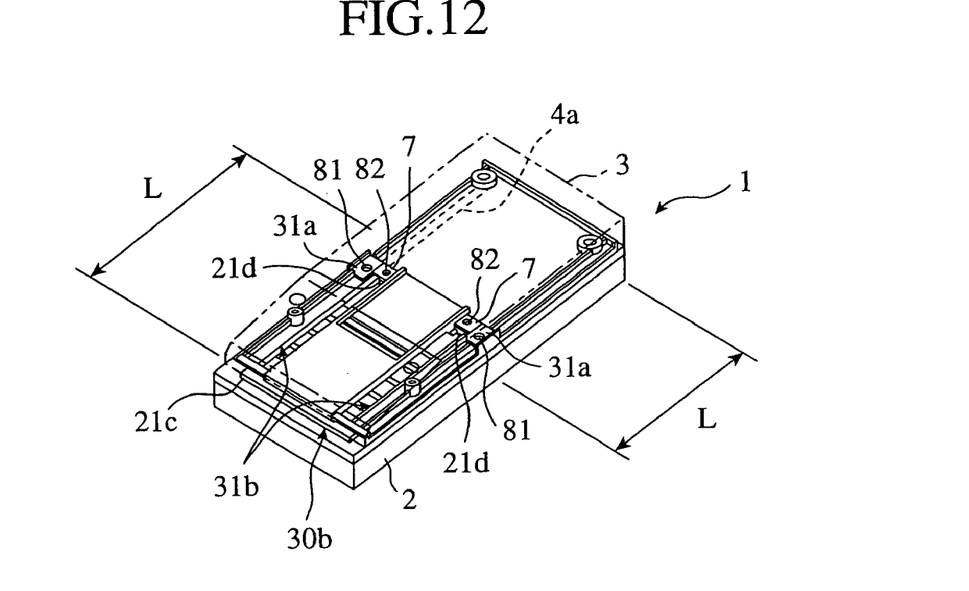
FIG. 12 is a partial perspective view showing the portable telephone according to the First and Second Embodiments of the present invention in the closed state.

Referring to FIG. 3, FIG. 7, and FIG. 12, two bosses 21d are provided on the top of the first plate 21. Each of these bosses 21d is provided at the position corresponding to the left end of each slit 21b and adjacent to the slit 21b in the area within the section L, and is formed so as to be projecting upwardly in the Z-axial direction.

As shown in FIG. 3, at the place between these two bosses 21d on the first plate 21a rectangular opening 21e long in the X-axial direction is formed. One of the ends of the band-shaped flexible substrate 6 extends through the opening 21e, and a connector 6a provided on one end of the flexible substrate 6 is connected to the connector 5a of the substrate 5.

Subsequently, the second body 3 will be described about the second base body 30 and second plate 31, which constitutes the primary structural members of the second body, and members placed therebetween.

On the underside of the second base body 30 a concavity formed in the shape of a picture frame, further, the central portion of the concavity forms a rectangular-plate shaped shallow concavity, and the substrate 9 is attached and secured to the shallow concavity (see FIG. 4 and FIG. 11).

On the underside of the substrate 9 a connector 9a (Not shown in FIG. 3; see FIG. 11) is equipped, and the connector 9a is connected with a connector 6b provided on one end of the flexible substrate 6, the other end of which is connected with the connector 5a as described hereinabove. At that time, the one-end of the flexible substrate 6 is turned around the left end of the second plate 31 and reaches the connector 9a.

At the concavity in the shape of a picture frame, formed in the underside of the second base body 30, the second plate 31, which is a size smaller than that of the second base body 30 and which is attached and secured to the cavity, is provided with the substrate 9 put therebetween. The fastening means is removably fastened to the second plate 31 by unscrewing a screw 83 from below of the right end of the second plate 31, and by unscrewing screws 84 from the upper side of the second base body 30 of the left end thereof.

Referring to FIG. 3, mounting eyes 31a are provided in the area within the section L on the second plate 31, which extends rightwardly from the left end of the second base body 30 in the Y-axial direction corresponding to the longitudinal direction. These mounting eyes 31a are located, as shown in FIG. 6 and FIG. 7, right above the slider 4b passing through the slit 21b of the first plate 21.

A screw 81 is screwed into the slider 4b through a screw hole formed on the mounting eye 31a, thus integrally fixing the slider 4b to the mounting 31a. In other words, the sliders 4b are integrated with the second body 3 (see FIG. 10).

The second plate 31 has two slits 31b formed in parallel spaced apart from each other in the X-axial direction. The boss 21d provided on the first plate 21 is slidably passing through each of these slits 31b. These slits 31b each extending in the Y-axial direction, and is within the range of the section L.

On each of the bosses 21d passing through these slits 31b and upwardly exposed an engaging pawl 7 is fixed from above with a screw 82. The engaging pawl 7 is of a rectangular-flat-plate form, as shown in FIG. 9, at the center of which a hole 7a is formed for screw, and a notch 7b is formed for engaging with the boss 21d formed on each end thereof in the Y-axial direction. As shown in FIG. 6 and FIG. 7, the engaging pawl 7 is engaged overhanging the step portion provided at the edge of the slit 31b.

The operation of the portable telephone of the internal structure according to the present invention will now be described below.

Figure 13:
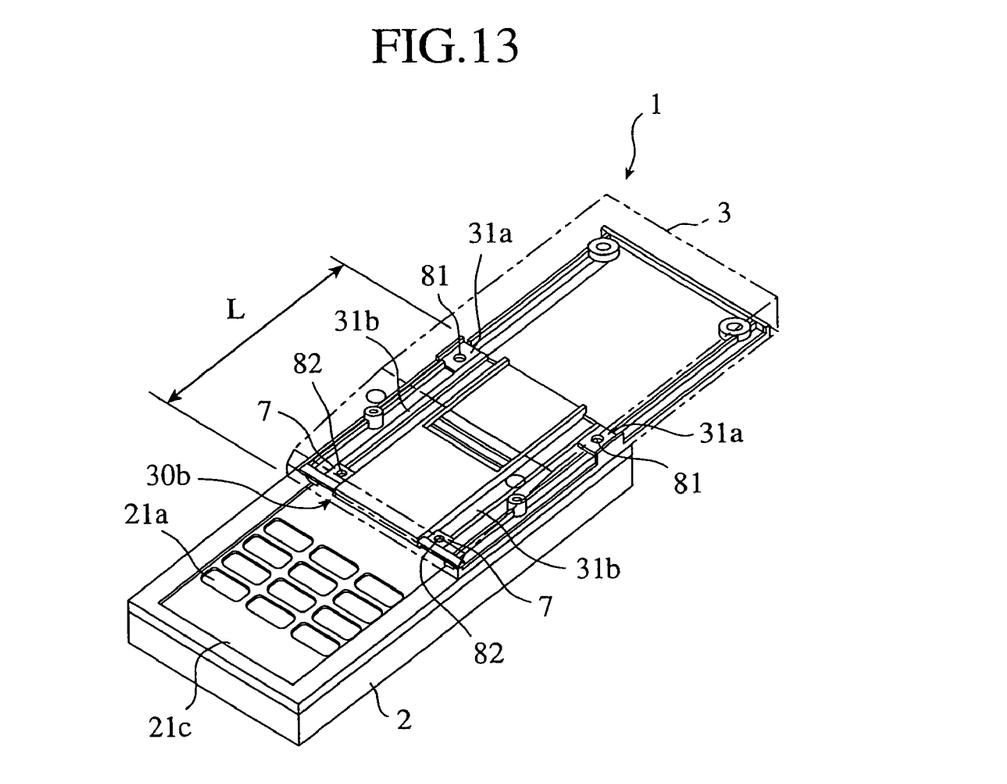
FIG. 13 is a partial perspective view showing the portable telephone according to the First and Second Embodiments of the present invention in the opened state.

FIG. 12 and FIG. 13 are oblique views each showing perspectively the portable telephone 1; FIG. 12 shows the portable telephone 1 in the closed state and corresponds to FIG. 1 and FIG. 3; and FIG. 13 shows the portable telephone 1 in the opened state and corresponds to FIG. 2, FIGS. 4-7, FIG. 10, and FIG. 11.

Referring to FIG. 13, the second body 3 is pulled out to the utmost relative to the first body 2, that is, the first body 2 and the second body 3 are superposed within the section L in the state where the slider 4b abuts the end of the slit 21b in the Y-axial direction.

At that time, the two engaging pawls 7 provided spaced apart from each other in the X-axial direction are engaged, as shown in FIG. 3, FIG. 6, and FIG. 7, such that a face of each of the engaging pawls is opposed to that of the step portion formed at the edge of the slit 31b within the section L, and further, the engaging pawl 7 and the edge of the slit 21b formed in the first plate 21 and the engaging pawl 7 pinch the slit 31b.

Thereby, restrictions are put on a separation of the first body 2 and second body 3, which prevents the second body 3 from being rotated, even if a moment M is acted on the second body 3, the moment M being centered on a fulcrum P positioned at the right end of the first body 2 in the Y-axial direction (in the lateral direction) on the second body 3 as shown in FIG. 5.

In case where the second body 3 in the opened state shown in FIG. 13 moves to the closed state shown in FIG. 12, alternatively, in case where the second body 3 in the closed state shown in FIG. 12, reversely moves, the face of the engaging pawl 7 slides along the edge of the slit 31b. This restricts a separation of the both bodies, and integrally maintains the both bodies in the stable state even during movement of the body.

Say in addition, there can possibly be a moment of which fulcrum lies on the end of the second body 3 on the first body 2, that is, a moment in the direction opposed to the moment M shown in FIG. 5. However, a face of the engaging pawl 7 slidably contacts with that of the edge of the slit 31b. This can also prevent a rotation thereof caused by the moment.

For this reason, the engaging pawl 7, the boss 21d and the slit 31b constitute an X-axis-rotation preventing means, which prevents one body from rotating on any one of axes parallel to the X axis relative to either of the fixed first body 2 or the fixed second body 3. Herein, changes of the shape of the slider 4b into a shape by virtue of which the slider is slidable along the slider rail 4b without getting out of the slide rail 4a, for example, to an inverted-T shape in FIG. 6 and FIG. 7, which conduces to reduce a load imposed on the engaging pawl 7 at the time of acting of the moment in the direction opposite to the moment M.

The engaging pawl 7 is provided separately from the first body 2, and arranged to be detachable therefrom by means of the screw 82. Thereby, it becomes possible to transform the material into one having higher slidability or higher strength.

In either of FIG. 12 and FIG. 13, the slider 4b integrally provided to the second body 3 fits in the slit 21b formed in the first plate 21 integrally provided to the first body 2. The slider 4b is made of a rectangular block, and the slit 21b has thickness in the Z-axial direction, which brings them into slidably face-to-facedly contact with each other. This securely prevents the second body 3 from rotating on the Z axis relative to the first body 2.

As a result, the slider 4b and the slit 21b constitute a Z-axis-rotation preventing means for preventing one body from rotating relative to either of the fixed first body 2 and the fixed second body 3 on any one of axes parallel to the Z axis. Thus, a single slider 4b and its attachment accompanying therewith may be one. Alternatively, when two sliders are provided as with this embodiment, the two sliders 4b, which are provided oppositely in the X-axial direction, are efficiently serviceable as the Z-axis-rotation preventing means.

Moreover, in either of the embodiments shown in FIG. 12 and FIG. 13, the bosses 21d spaced apart from each other in the X-axial direction are arranged to engage in the slits 31b as shown in FIG. 6 and FIG. 7. Accordingly, it can be said that these members may also constitute the Z-axis-rotation preventing means.

Figure 14:
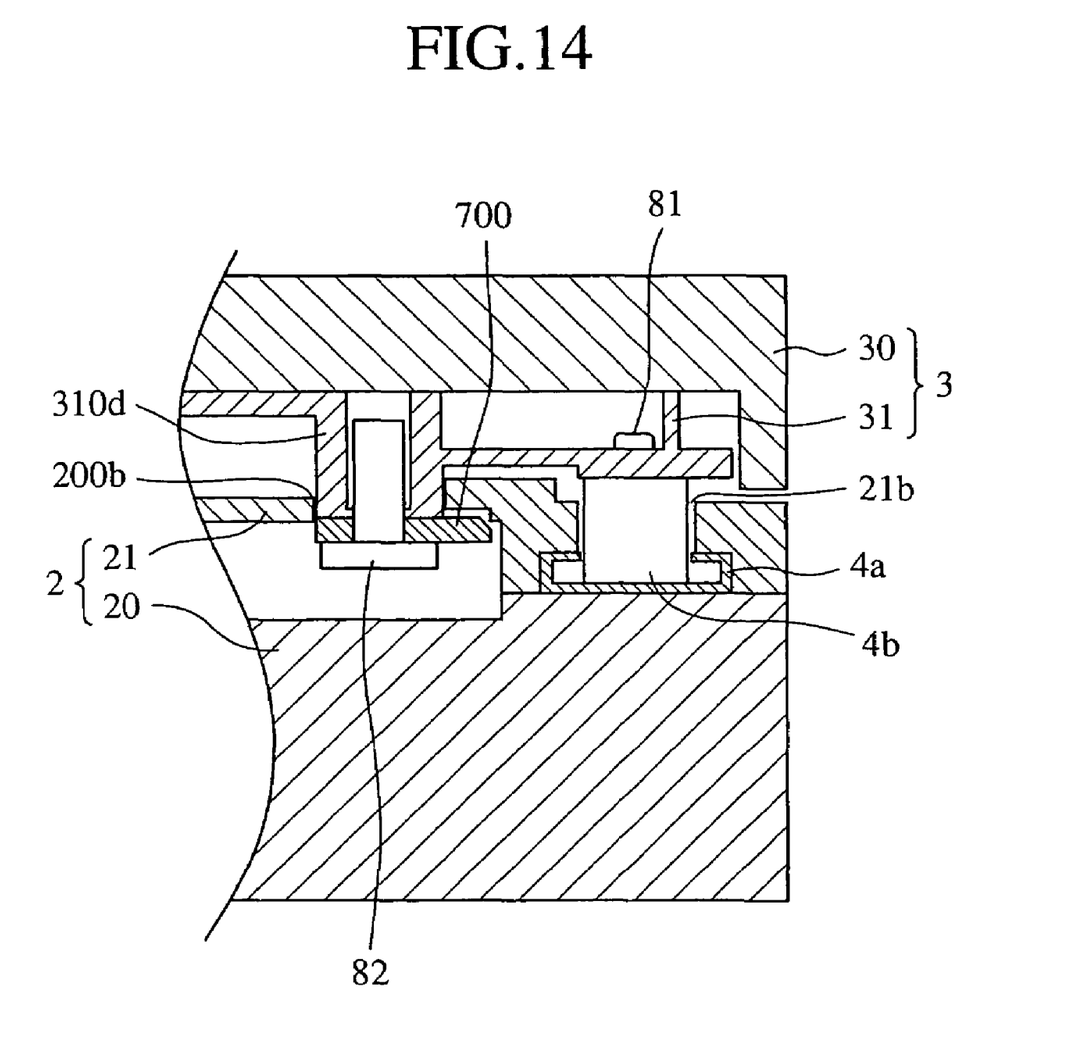
FIG. 14 is a sectional view showing the portable telephone according to the Second Embodiment of the present invention.

In FIG. 7 and FIG. 14, which are sectional views each showing the portable telephone viewed from the Y-axial direction, the slit 31b in which the boss 21d fitted and the slit 21b along which the slider 4b fitted each having thickness in the Z-axial direction (in the vertical direction), and these thicknesses slidably contact with the boss 21d and the slider 4b, respectively. This prevents the second body 3 from rotating on the Y axis relative to the first body 2. Therefore, these boss 21d, slit 31b, slider 4b, and slit 21b constitute a Y-axis-rotation preventing means.

According to this embodiment, the rotation preventing mechanism is provided within the area in which one of the two bodies is superposed on the other in the extended state, thereby precluding the rotation preventing mechanism being exposed to the decorated exterior and lightening the restriction on the freedom of design. Moreover, the rotation preventing mechanism is intensively provided within the superposed area. This enables the space required for disposing the rotation preventing mechanism to be successfully reduced to nearly half compared with the case where the mechanism is disposed in the whole area of the body as with the prior art, with the result that more wider internal mounting space is available as space reduces.

As shown in FIG. 2, FIG. 3, FIG. 4, and FIGS. 11-13, an auxiliary concavity 21c is formed in the operation face portion on which operation keys 21a exposed to outside the superposed area (outside the section L) are placed on the first plate 21 constituting the first body 2 in the state where the second body 3 is pulled out.

Meanwhile, in FIGS. 1-3 and FIGS. 11-13, an auxiliary convexity 30b engaging in the auxiliary concavity 21c is provided below the left end of the second base body 30 constituting the second body 3 in the Y-axial direction, and engages the auxiliary convexity 30b in the auxiliary concavity 21c, thereby preventing the two bodies from relatively rotating on any one of the axes parallel to the Z axis.

The auxiliary concavity 21c is exposed to outside as a visible portion when the first body 2 is pulled out; however, the auxiliary concavity is formed shallowly on the top of the first plate 21 with an edge left along the outline thereof, and the concavity does not extend to the side thereof. Therefore, this arrangement enables effective utilization of both end portions of the first body in the X-axial direction, and provides an auxiliary-rotation preventing mechanism with less design restrictions.

Furthermore, the formation of the auxiliary concavity 21c provides the increased clearance between the two bodies, and receives therein the flexible substrate 6 (or a cable) serving as the wiring member electrically connecting the two bodies 2 and 3 by availing itself thereof.

The engaging pawl 7, the slider 4b, and their engaging members basically offer the rotation preventing capability according to the present invention. Hence, it eliminates the necessity of the auxiliary concavity and the auxiliary convexity. However, the provision of several rotation preventing means give the reinforced rotation preventing capability and the improved safety.

Second Embodiment

In the First Embodiment, as shown in FIG. 7, the engaging pawls 7 and the bosses 21d are provided in the first plate 21 constituting the first body 2, and the member with which the engaging pawl 7 engages is taken as the edge of the slit 31b formed on the second plate 31 constituting the second body 3. In lieu thereof, as shown in FIG. 14, a boss 310d is provided on the second plate 31 constituting the second body 3 Then, an engaging pawl 700 is attached to the boss. In turn, a slit 200b guiding the boss 310d is formed in the first plate 21 constituting the first body 2. Lastly, the member with which the engaging pawl 700 engages is provided in the first plate 21 constituting the first body 2. The other arrangements thereof are the just same as that of the First Embodiment.

Even in this arrangement, the engaging pawl 700 integrally provided to the second body 3 engages with the second plate such that the engage pawl face-to-facedly pinches the edge of the slit 200b formed in the first plate 21 integrally provided to the first body 2, which offers the same rotation-preventing capability as that of the First Embodiment described hereinabove. Besides, the Second Embodiment provides the rotation preventing capability proportionate to that described in the First Embodiment. In this arrangement, it provides the decreased places at which the engaging pawls 700 and the sliders 4b are screwed on the first body 2, and intensively provides the places where a crew is to be screwed on the second plate 31, which simplifies an assembly procedure.

INDUSTRIAL APPLICABILITY

As mentioned hereinabove, the portable telephone according to the present invention is arranged such that it expands and contracts its total length by sliding, prohibits the rotation preventing mechanism from being exposed to outside during sliding, and gives the increased elements-mounting space. Therefore, this invention is suitable for achieving an aesthetically excellent and high-performance portable telephone.

The invention claimed is:

1. A portable telephone, comprising:
   a first body; and
   a second body slidably superposed opposed to the first body, wherein the portable telephone has a closed state in which opposite faces totally superposes each other and an opened state in which the opposite faces partially superposes each other,
   wherein said first body, within an area in which the first body is superposed on the second body in the opened state, includes:
      a first slit in which a slider fixed on the second body is slidably engaged; and
      a boss, provided at a position adjacent to an end of the first slit, which is configured to project upwardly above the first body, wherein the slider contacts with the end of the first slit in the closed state,
   and wherein said second body, within an area in which the second body is superposed on the first body in the opened state, includes a second slit in which the boss is slidably engaged.

2. The portable telephone according to claim 1 further comprising:
   an engaging pawl provided in one of the two bodies being slidably engaged with the other body within the area in which the first body and the second body are superposed on each other in the opened state.

* * * * *